United States Patent [19]

Rauch et al.

[11] Patent Number: 4,731,727
[45] Date of Patent: Mar. 15, 1988

[54] INTELLIGENT OPTIMUM-GEAR INDICATION SYSTEM

[75] Inventors: Hans Rauch, Fürth; Jürgen Wesemeyer, Nürnberg, both of Fed. Rep. of Germany

[73] Assignee: Robert Bosch GmbH, Stuttgart, Fed. Rep. of Germany

[21] Appl. No.: 734,264

[22] PCT Filed: Aug. 30, 1984

[86] PCT No.: PCT/DE84/00170
§ 371 Date: May 8, 1985
§ 102(e) Date: May 8, 1985

[87] PCT Pub. No.: WO85/01256
PCT Pub. Date: Mar. 28, 1985

[30] Foreign Application Priority Data

Sep. 21, 1983 [DE] Fed. Rep. of Germany ......... 334093

[51] Int. Cl.⁴ .............. B60K 41/18; B60Q 9/00; G09B 19/16
[52] U.S. Cl. ................................... 364/442; 364/424.1
[58] Field of Search ............... 364/424.1, 442; 74/866; 340/92 D

[56] References Cited

U.S. PATENT DOCUMENTS

| | | | |
|---|---|---|---|
| 4,198,882 | 4/1980 | Klencke et al. | 74/866 |
| 4,208,925 | 6/1980 | Miller et al. | 74/866 |
| 4,398,910 | 6/1983 | Lockhart | 364/424.1 |
| 4,411,174 | 10/1983 | Yokoi et al. | 74/866 |
| 4,463,427 | 7/1984 | Bonnetain et al. | 364/424.1 X |
| 4,492,112 | 1/1985 | Igarashi et al. | 364/442 |
| 4,517,646 | 5/1985 | Magnusson et al. | 364/424.1 |
| 4,559,599 | 12/1985 | Habu et al. | 364/424.1 |

FOREIGN PATENT DOCUMENTS

| | | |
|---|---|---|
| 2658464 | 6/1978 | Fed. Rep. of Germany . |
| 3128080 | 2/1983 | Fed. Rep. of Germany ... 364/424.1 |
| 2030661 | 4/1980 | United Kingdom . |
| 2084524 | 4/1982 | United Kingdom ............... 364/442 |

Primary Examiner—Felix D. Gruber
Attorney, Agent, or Firm—Frishauf, Holtz, Goodman & Woodward

[57] ABSTRACT

A method and a circuit for determining the optimum gear, in terms of fuel consumption, of a motor vehicle drive is proposed, in which after upshifting, a driving power sufficient for accelerating the vehicle is to be made available regardless of such power parameters as total vehicle weight, roadway grades and the like and also regardless of the gear ratios of the gear steps. To this end, during driving, the gear ratios of the gear steps are ascertained by comparing the speeds ($n$, $n_1$) before and after the transmission (12). Furthermore, these speed values ($n$, $n_1$) as well as the gas pedal position ($\phi$) are continuously stored briefly in memory during the drive, and a standardized power is ascertained based on the change in the driving speed ($n_1$). After a gear shifting operation, the newly ascertained standardized power is compared with the standardized power ascertained prior to shifting, and if the new standardized power is the same or greater, the values for the driving speed ($n_1$) and gas pedal position ($\phi$) measured prior to the upshifting are recorded in a threshold value memory (24). An upshifting indication is always effected whenever the instantaneous measured values ($n_1$, $\phi$) exceed the stored threshold values in the direction of an unfavorable operating range in terms of fuel consumption. The method is applicable to both Diesel and gasoline engines as well as to large and small motors and to any arbitrary, but fixed, gear step ratios.

10 Claims, 4 Drawing Figures

INTELLIGENT OPTIMUM-GEAR INDICATION SYSTEM

The invention relates to a method for determining the optimal gear, in terms of fuel consumption, of a motor vehicle drive which adapts itself as it learns how the vehicle responds to the particular driver, road conditions, and engine condition encountered during a drive. The invention also relates to a circuit for performing the method.

BACKGROUND

In a known circuit arrangement for controlling a gear shift indicator of a motor vehicle drive, threshold limit values, ascertained for each gear by the vehicle manufacturer, for shifting into the next-higher gear are fed into an electronic read-only memory. During vehicle operation, the speed values and gas pedal positions that are ascertained on a continuous basis are compared with the threshold or limit values in a computer, and if the limit values are exceeded, a signal for shifting to a higher gear is triggered (German Patent Disclosure Document, laid open No. DE OS 31 28 080 Feb. 3, 1983). This arrangement has the disadvantage that the threshold or limit values must be ascertained for each vehicle type in accordance with the gear ratios of the gear steps and in accordance with the engine's power rating, based on an assumption that the engine is optimally tuned. Since after breaking in, engines may already have considerable fluctuations in power as compared with the rated value, and since in the course of time further power fluctuations are brought about by adjustments of the ignition or the carburetor or fuel injection pump, the threshold values ascertained by the manufacturer for gear shifting may be only approximate values. Furthermore, this method does not take into consideration changing load conditions or the grade of the roadway while driving when indicating a shift into a higher gear.

With the present invention, the object is to develop a method for determining the threshold values for shifting gears which enables optimum power at minimum fuel consumption, regardless of the size of the engine, the vehicle load or the gear ratios.

THE INVENTION

The method according to the invention for determining the optimum gear for fuel consumption has the advantage that the limit or threshold values, of gas pedal position and engine speed that are required for shifting gears, are ascertained only after the circuit has been installed in the motor vehicle and during a first distance driven. Consequently, such a system is generally applicable in all vehicle types, without having to make any adaptations or changes. It determines the vehicle-specific and hence correspondingly accurate threshold values for fuel consumption-optimal gear shifting, and after the shifting has been done at least the same power can be made available by the driving motor as before. A further advantage is that in accordance with the method according to the invention and the circuit required for it, the driving performance of the driver is also taken into consideration in determining the threshold or limit values. By measuring a so-called standardized power prior to and following gear shifting, different threshold values will be determined and stored in memory in the case of a skilled driver, who needs only a short time for shifting, than in the case of a driver who needs a longer time to shift into the new gear.

Briefly, it is particularly advantageous if for each gear, in the area of a threshold value memory associated with it, the threshold values that have been determined are stored in a memory matrix laid out in steps in accordance with the engine speed and the gas pedal position. After the threshold values have been determined and stored in memory, the instantaneous values for engine speed and gas pedal position are compared with the threshold value for the gear presently engaged that are stored in the threshold value memory, so that a signal for upshifting can be triggered whenever the instantaneous values exceed the threshold values in the direction of an operating zone that is unfavorable in terms of fuel consumption.

The circuit for performing the method, has the advantage that already provided transducers for measuring engine speed and the gas pedal position can also be used for the circuit, and that practically any vehicle can be retrofitted with such a circuit. The evaluation circuit is preferably implemented using a microcomputer, to the output of which an upshifting indicator is connected.

BRIEF DESCRIPTION OF THE DRAWINGS

An exemplary embodiment of the invention is shown in the drawing and explained in further detail in the ensuing description. Shown are.

Figure 1:
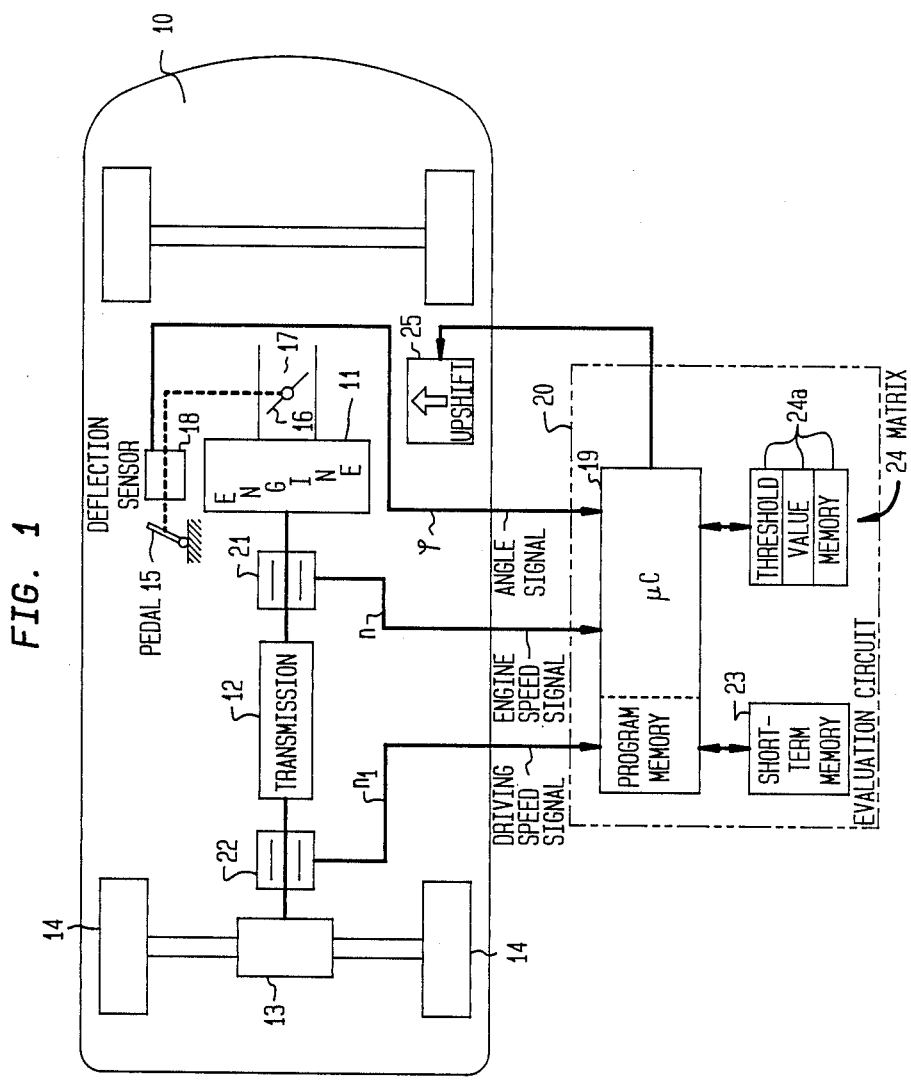
FIG. 1, a motor vehicle represented symbolically, with a block circuit diagram of the circuit for performing the method according to the invention.

DETAILED DESCRIPTION:

In FIG. 1, a motor vehicle, arbitrarily shown symbolically, is marked 10, and an internal combustion engine, as its drive motor 11, is installed in it. The drive motor 11 is coupled with two drive wheels 14 of the motor vehicle via a disengageable, shiftable multi-step transmission 12 and a differential 13. A gas pedal, 15 that is to be actuated by the driver using his foot, is connected, via a mechanical operative connection shown in broken lines, to a throttle 16 in the in-take tube 17 of the drive motor 11. The gas pedal 15 also acts in a known manner upon a fuel supply means, not shown, such as a carburetor or injection pump of the drive motor 11. A position transducer 18 sensing the position of the gas pedal 15 or throttle 16 is electrically connected to the input of a microcomputer 19 of an evaluation circuit device 10. A transducer 21 between the motor 11 and transmission 12 which senses the speed n of the drive motor 11 is also connected to one input of the microcomputer 19. Via a third transducer 22 at the output of the transmission 12, the output speed $n_1$ of the transmission 12 is sensed and likewise sent to an input of the microcomputer 19. The speed value $n_1$ is at the same time a value for the driving speed or moving speed of the vehicle 10. Also connected to the microcomputer 19 are a transient memory 23, as a short term memory, and a threshold value memory 24, which is subdivided in turn into individual ranges for each gear, each comprising one memory matrix 24a. No range is provided in the threshold value memory, however, for reverse gear or for the highest gear. An upshift indicator 25 is connected to the output of the microcomputer 19 and generates a visual signal whenever the drive motor 11 is capable of operating more economically at a higher gear of the multi-step transmission.

The method for determining the optimal gear in terms of fuel consumption and the mode of operation of the circuit provided therefor and shown in FIG. 1 will now be described in further detail, referring to the flow diagram of FIG. 2 and the characteristic curves of FIGS. 3 and 4. When the vehicle 10 is started up, first the gear ratios of the gear steps are ascertained, and then the threshold values are determined and stored in memory for each gear, with the exception of the highest gear. Finally, during the drive, data are continuously compared with the threshold values and an upshifting indication is triggered as needed.

When the motor vehicle electrical system is started, the first operation after the start 49 of the computer program is a checking step 30 as to whether the starting switch for the engine has been switched on. Via a loop, the program remains at this program step until such time as the current circuits required for driving have finally been switched on. In the next step 31, the engine speed n and the output speed $n_1$ of the transmission 12 are sensed. If both values are greater than zero, then the the engine is running and the vehicle is in operation. In the next step 32, the ratio between the speeds n and $n_1$ is determined and the translation ratio of the gear that is engaged is accordingly ascertained. In step 33, the value determined repeatedly over a brief period of time is recorded in a register, and a register counter is increased by 1. The number of occupied register locations corresponds to the number of gears in the transmission 12. In a further step 34, the register contents are arranged by magnitude as needed, so that the individual gears g are associated with the registers in ascending order. With the engine 11 running, the measured speed values n, $n_1$, the value $\phi$ for the gas pedal position and the engaged gear g are now, in step 35, stored in the short-term memory 23, for instance for a period of 10 seconds. In the next step 36, by a comparison of the speed values n and $n_1$, it is determined whether gear shifting in the transmission 12 has been performed. If the two speed values are no longer in a fixed ratio with one another, this is the case. In the next step 37, the values most recently stored in the short-term memory 23 are then called up and fed into an intermediate or buffer memory of the microcomputer 19. In the next step 38, a value which will be called herein a standardized power Pn is determined, on the basis of the output speed $n_1$ over time; in so doing, the difference among the squared values of the speeds $n_1$ measured in quick succession at the transmission output is determined. The standardized power prior to the gear shifting operation is determined in the microcomputer 19 in accordance with the following algorithm:

$$Pn = n_{1a}^2 - n_{1b}^2.$$

The value $n_{1a}$ is the speed measured most recently prior to the shifting operation, and the value $n_{1b}$ is the speed measured for instance 2 seconds earlier than that. Both values are taken from the short-term memory 23. In step 39, by comparing the speeds n and $n_1$, it is now determined whether the upshifting operation in the transmission has been completed. As soon as that is the case, a check is made in the next step 40 as to whether the transmission 12 was shifted into the next higher gear (g+1). If that is the case, then in step 41 further speed values n, $n_1$ as well as the gas pedal position $\phi$ and the engaged gear are stored in the short-term memory 23. After three seconds, in step 42, the new standardized power Pn2 is determined; this value appears after the upshifting of the transmission. For this calculation, the most recently measured speed value $n_{1c}$ as well as the speed value $n_{1d}$ measured 2 seconds previously are taken from the short-term memory 23 and used, and the standardized power is determined as follows:

$$Pn_2 = n_{1c}^2 - n_{1d}^2.$$

In the next step 43, it is now determined whether the standardized power $Pn_2$ measured after upshifting of the transmission 12 is equal to or greater than the standardized power $Pn_1$ prior to the upshifting operation. If that is the case, then the actual drive power of the vehicle has not been decreased by the upshifting operation; in other words, the upshifting has proceeded successfully.

By means of the so-called standardized power Pn, the influence of various power parameters such as vehicle weight, roadaway upgrades, air and frictional resistance, tire pressure etc., deviations from rated engine power, skilled or unskilled drivers, fuels of varying quality and so forth are eliminated. It is merely assumed that these parameters are of equal magnitude prior to and following the upshifting operation. Now if the standarized power following the upshifting is equal to or greater than prior to the shifting operation, then along with the upshifting, the fuel consumption of the vehicle per unit of time has been reduced, with the same power and consequently the same moving speed. Care must be taken to assure that in future shifting operations, an upshifting indication is always triggered whenever, during the drive, the engine 11, in the same gear g, reattains the working point assumed most recently prior to the upshifting. FIG. 3 shows such a working point A1 by way of example for upshifting from second gear in the transmission 12; this point is determined from the value of the measured engine speed n of 2000 min$^{-1}$ and the value of the measured gas pedal position $\phi$ in angular degrees of 30°. The working point A1 represents an at least temporary threshold for upshifting of the transmission. This threshold value must consequently be fed in the next program step 44 into the memory matrix 24a of the threshold value memory 24 for second gear. The binary memory matrix 24a of the threshold value memory 24 is laid out in fine gradations into individual memory locations, in rows according to angular ranges for the gas pedal position $\phi$ and in columns according to speed ranges of the engine speed n. The working point A1 of FIG. 3 is now fed into the region of the threshold value memory 24 for second gear in such a manner that a "1" is recorded in all the memory locations above the speed n of 2000 min$^{-1}$ and below the gas pedal position $\phi$ of 30°. All the other memory locations retain an "0" as their initial content.

Figure 3:
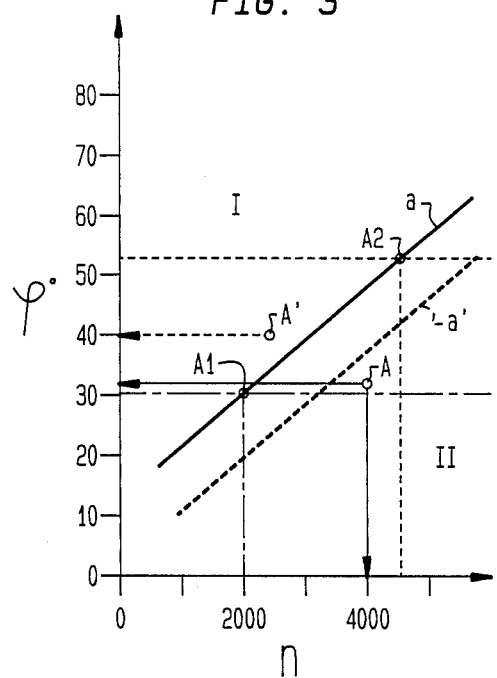
FIG. 3, a threshold value characteristic curve of the threshold value memory of FIG. 1 for one gear.
Figure 4:
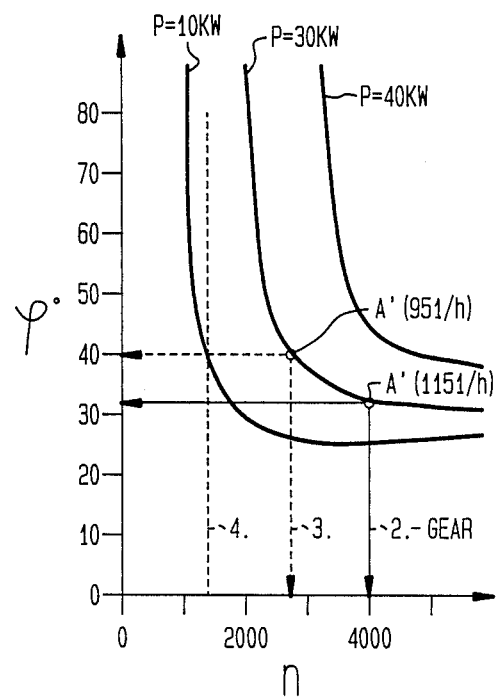
FIG. 4, power curves for the drive motor of the motor vehicle.

Upon a later upshifting out of second gear without any power loss, a second working point A2 is ascertained as a threshold value in the same manner, as shown in FIG. 3, and recorded into the region of the threshold value memory 24 for second gear, in that all the memory locations above a speed n of 4600 and below a gas pedal position $\phi$ of 54° are assigned a content of "1". In this manner, within the first 10 to 100 km of driving, sufficient threshold values are recorded in the memory matrices 24a of the threshold memory 24 as to form one operating zone I having memory locations with the content "0" for an engine operating state that is favorable in terms of fuel consumption and one operating zone II comprising memory locations having the content "1" for an engine operating state that is unfavorable in terms of fuel consumption in each memory matrix 24a of the threshold value memory 24. Both operating zones I and II are shown separately in FIG. 3, divided by a threshold value curve a.

Figure 2:
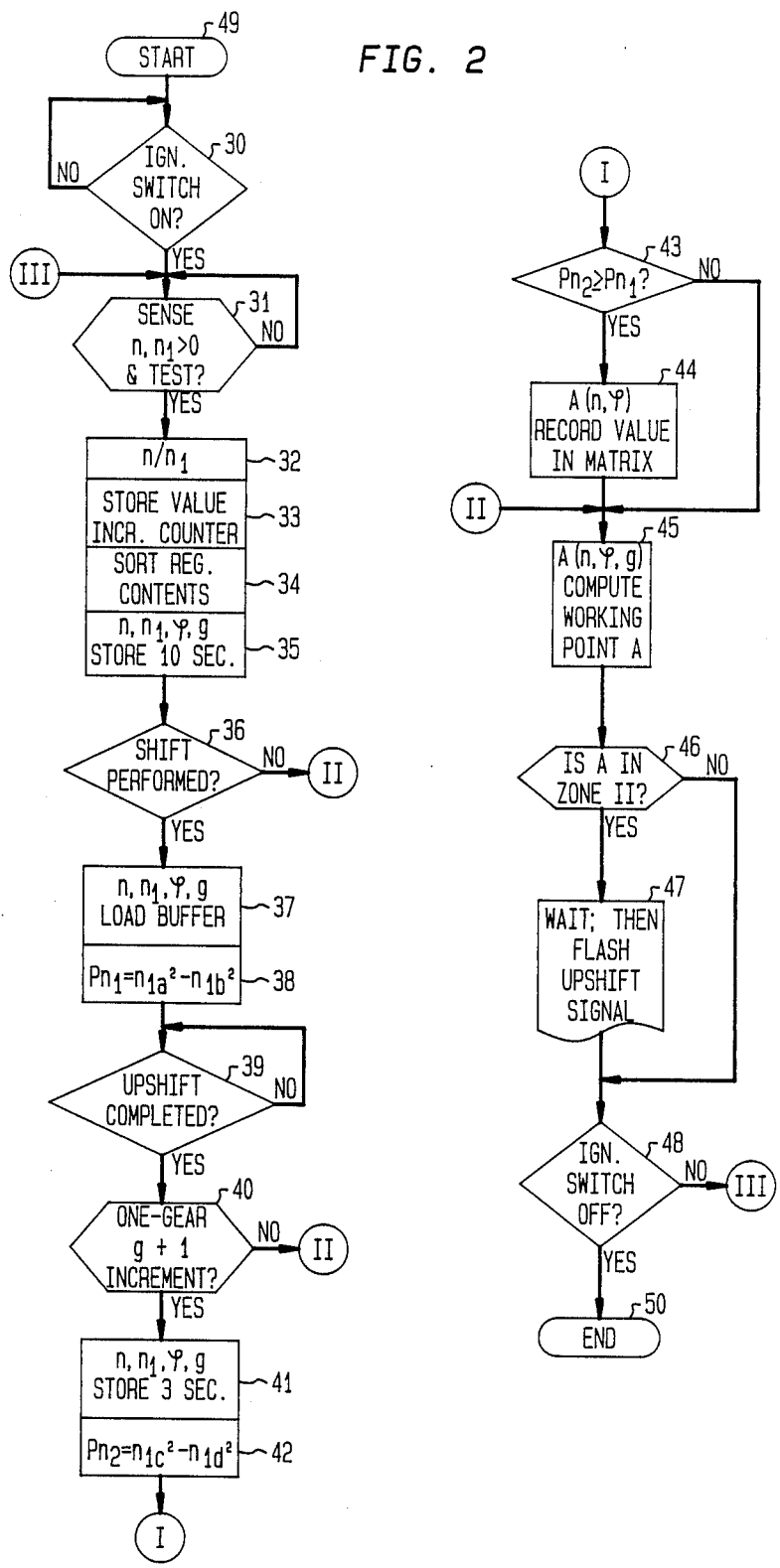
FIG. 2, a flow diagram for a computer in the circuit according to FIG. 1 for determining the threshold values and for triggering an upshifting indication.

In a further program segment shown in FIG. 2, there is continuous monitoring, with a gear engaged, as to whether the fuel consumption can be reduced, at the instantaneous drive output, by upshifting of the transmission. To this end, in program step 45, the instantaneous working point A of the engine 11 is first ascertained from the engaged gear g and the values for speed n and gas pedal position $\phi$. In the next step 46, it is determined whether the ascertained working point A is within the unfavorable fuel consumption zone II of the corresponding memory matrix 24a of the threshold value memory 4 in which the memory locations have a content of "1". As soon as that becomes the case, in step 47, after a waiting period of approximately 3 seconds, a signal is sent from the microcomputer 19 to the upshifting indicator 25 (FIG. 1), thereby instructing the driver to shift the transmission to a higher gear. In the next program step 48, a check is made as to whether the ignition switch is OFF and hence whether the motor is shut off. As soon as this occurs, at the end of the drive, the end 50 of the program is reached.

However, as long as the ignition switch is still ON, the program returns after program step 48 back to program step 31, as indicated by the symbols III—III in FIG. 2, so as once again, in the above-described manner, to determine the engaged gear and to record new values for the speeds n, $n_1$, the gas pedal position $\phi$ and the gear g into the short-term memory 23. As long as no gear change occurs, the program skips after step 36 to step 45, as indicated by the symbols II—II, and in the above-described manner again determines the instantaneous working point A of the engine. Only once a gear change has been made does the program again run from step 36 to steps 37 and 38, in order to determine the standardized power Pn. As soon as the transmission 12 has been downshifted, or reengaged in the same gear, a comparison of the standardized power prior to and following the shifting operation is not required. The program therefore skips after step 40 to step 45, as indicated by the symbols II—II, in order to determine and monitor the instantaneous operating state of the engine 11. After program step 43 as well, the program always skips to step 45 if the comparison of the standardized power Pn prior to and following the upshifting indicates that the most recently measured standardized power Pn is less than the standardized power (Pn) n determined prior to the upshifting of the transmission 12. In these cases, accordingly, the previously determined working point is not fed into the threshold value memory 24, because the drive power required for operation prior to the upshifting was no longer attained following the upshifting. In the continuous monitoring of the working point A of the motor 11, the program always skips step 47, that is, the step for flashing an upshifting signal, if it is determined that the ascertained working point A is in the favorable fuel consumption zone I of the threshold value memory 24, the memory locations of which are occupied by a "0".

In the exemplary embodiment of FIG. 3, the working point A was determined in second gear at an engine speed n=4000 min$^{-1}$ and a gas pedal position $\phi$=32°. The memory location in the memory matrix 24a of the threshold value memory 24 assigned to this working point A for second gear is below the threshold line a. The memory location of the threshold memory 24 associated with the working point A for second gear therefore has a content of "1". This means that in accordance with program step 47, an upshifting signal is sent to the upshifting indicator 25. The characteristics graph of FIG. 4 shows that at this working point A, the motor 11 produces an output P=30 KW and has a fuel consumption rate of 11.5 liters per hour. Now as soon as the driver obeys the instruction to shift upward, the speed n of the motor 11 will drop in third gear to approximately 2900 min$^{-1}$, as shown in FIG. 4, and the gas pedal will be depressed further, as far as $\phi$=40°, in order to attain the same power. The fuel consumption at the new working point A' accordingly drops to 9.5 l per hour. Assuming that the threshold value lines a for the various gears have approximately the same course, it can be inferred from FIG. 3 that the new working point A' is now in the favorable fuel consumption zone I for third gear in the threshold value memory 24. From FIG. 4, it is also apparent that upon a further upshifting to fourth gear (indicated by broken lines), the engine speed n drops so far that the previously required drive output of 30 KW can no longer be produced by the engine 11.

The invention is not restricted to the exemplary embodiment, because the method for detecting the optimal gear in terms of fuel consumption can be embodied in still further ways by means of additional program steps. The following method steps, however, are essential. During a driven distance, the output speed $n_1$ of the transmission 12, or a corresponding variable such as the speed of a drive wheel, is measured in common with the engine speed n and the gear engaged at that time is determined from these data. The measured values for the engine speed n and for the output speed $n_1$ as well as the value $\phi$ of the gas pedal position are furthermore continuously stored in memory for brief periods. Each time an upshifting of the transmission 12 is completed, the new standardized power Pn2 is compared with the standardized power Pn1 ascertained prior to the upshifting, and if the new standardized power Pn2 is the same or greater, the values for the engine speed n and gas pedal position $\phi$ measured and stored in memory prior to the upshifting are fed into a region of a threshold value memory associated with the gear that had been engaged prior to the upshifting.

In this manner, during the drive, numerous threshold values A1, A2 . . . , which divide the favorable operating range of the engine 11 in terms of fuel consumption from the unfavorable operating range, are recorded in the threshold value memory 24, laid out in the regions for the individual gears, as a consequence of repeated upshifting of the transmission 12 to various gears at various engine speeds n and various gas pedal positions $\phi$. With the exception of reverse gear and the highest gear, the ascertained threshold values for each gear are recorded in the threshold value memory 24 in a memory matrix 24a laid out in an arbitrarily fine gradation in terms of the engine speed n and the gas pedal position $\phi$. Prior to the first drive and at the beginning of the learning phase of the shift indicator, three different basic states of the memory matrices can be assumed. In one case, all the memory locations are erased, or in other words are occupied by an "0". After each successful shifting operation, the microcomputer sets specialized regions of the matrix to "1" and thus successively builds up the zone II as shown in FIG. 3. In the second case, all the memory locations are initially set. After each successful shifting operation, the zone II is reduced in size by erasing specialized matrix regions. However, it is equally possible, in a modification of the exemplary embodiment, for various basic values to be fed into the threshold memory 24 prior to the beginning of a drive, for instance by the manufacturer, in the form of a temporarily coarsely defined characteristic curve; then during the first drive these values can already be used for an upshifting indicator, and then replaced in memory by more accurate threshold values during the drive, in that further memory locations in the memory matrix 24a are assigned a "1" by means of the program of the microcomputer 19. By means further program steps, individual threshold values recorded in the threshold value memory can also be cancelled again, if during later drives the standardized power $Pn_2$ following an upshifting of the transmission 12 at these threshold values repeatedly fails to attain the standarized power $Pn_1$ prior to the upshifting. In this manner, it is possible to correct the threshold value line a (FIG. 3), by means of the driving behavior of the driver. This is necessary for instance if a different driver no longer shifts upward as quickly or accelerates as far as a previous driver. The moving speed could accordingly drop so far that the motor 11 is no longer capable of developing the required driving power, thus necessitating shifting back down again. An upshifting indication should be provided, however, only whenever the drive power in the next higher gear does still permit an acceleration of the vehicle in every case. To this end, the instantaneous values fo the engine speed n and the gas pedal position $\phi$ are each compared with the threshold values stored in the threshold value memory 24 for the particular gear engaged at the time, and an upshifting indication is triggered only if the instantaneous values n and $\phi$ exceed the threshold values in the direction of the unfavorable fuel consumption zone II.

On the condition that the two speeds $u_{1d}$ and $n_{1c}$ differ only insignificantly from one another, it is possible to detect a standardized power merely by calculating the difference between the speeds $(n_{1a}-n_{1b})$ or $(n_{1c}-n_{1d})$.

Nor is the circuit for performing the method restricted to the exemplary embodiment. For instance, instead of the gas pedal position, the position of the throttle, or in a fuel-injected engine the position of the governor rod of a fuel injection pump can be detected in order to ascertain the working point. Instead of the speed transducer 22 on the output shaft of the transmission 12, a speed transducer for an anti-skid brake system located on one or more of the drive wheels can also be used. A tachometer transducer already present in a motor vehicle can also be used for this purpose. For the engine speed n, instead of the transducer 21 it is also possible to use a dead center transducer, ignition timing mark transducer or the high-voltage pulse during the ignition process, so that in retrofitting a vehicle with the circuit according to the invention the existing transducer devices can be used as needed, with appropriate adapters, in order to ascertain the required operating data. The short-term memory 23 can be a transient memory generated by software, such as a shift register with sufficient memory capacity; however, it can also be realized in common with the intermediate memory in the form of a RAM, in that the stored data are cyclically overprinted. The beginning of a shifting operation at the transmission 12 can be recognized by the microcomputer 19 in that with the vehicle speed remaining virtually the same, the engine speed rapidly decreases or increases. It is also possible, however, to detect the beginning and end of a shifting operation by means of a clutch switch on the transmission coupling and to supply this to the microcomputer 19 via a further input.

The essential advantage of the method according to the invention over the known methods for determining the optimal gear of a motor vehicle transmission in terms of fuel consumption is that regardless of the load status, the grade of the roadway, and air and frictional resistance, and regardless of the gear ratios of the gear steps and the power rating of the engine of the vehicle, the threshold values are determined separately for each gear. The system is intelligent, i.e., is capable of learning, because each time the transmission is shifted upward when the power is at least equally high after the upshifting operation, more and more threshold values are fed into the threshold value memory 24 in succession, so that as the driving time increases a finely graduated or continuous threshold value curve a for upshifting without reducing the drive power is formed incrementally. Thus the sensitivity and accuracy of the upshifting indicator increases along with the number of successful upshifting operations, and even later the upshifting indication adapts to another kind of driving behavior or a change in power brought about for instance by used-up spark plugs, adjustment of the carburetor or injection pump, or changes in the ignition timing.

Instead of a visual and/or acoustical upshifting indicator, however, it is also possible within the scope of the invention for the upshifting signal emitted by the switching device to be used for shifting an automatic transmission. Downshifting of the transmission can also be realized, with a downshifting signal being generated by the switching device whenever, with the gas pedal depressed virtually fully and at an engine speed of less than 1500 $min^{-1}$, a negative acceleration is detected. Furthermore, in this case, the program steps 32 through 34 of the microcomputer program for detecting the engaged gear in accordance with FIG. 2 can be dispensed with, if in automatic transmissions the individual gears are ascertained by correspondingly assigned switches.

What is claimed is:

1. Method of intelligently determining and indicating the gear of a motor vehicle drive which optimizes fuel consumption without decreasing the drive power, comprising the steps of:

(a) measuring the driving speed ($n_1$) of the vehicle (10) and the engine speed (n), and determining, from the ratio of said speeds, which gear (g) is engaged at that time;

(b) continuously storing in a short-term memory (23) the instantaneous measured values of the driving speed ($n_1$) and the engine speed (n) as well as the gas pedal deflection angle ($\phi$), said engine speed and deflection angle values (n, $\phi$) together defining a working point pair (A1, A2, . . . );

(c) deriving from the values of the driving speeds ($n_1$) measured in brief succession, a standardized power value (Pn) and temporarily storing said power value;

(d) after each completed upshifting of the transmission (12), deriving a new standardized power value ($Pn_2$) and comparing said newly derived value with the standardized power value ($Pn_1$) determined prior to the upshifting; and (e) testing whether the new standardized power value ($Pn_2$) is at least equal to said value ($Pn_1$) prior to the upshifting, and, if so, copying from said short-term memory (23) the values, for engine speed (n) and gas pedal deflection angle ($\phi$) which were measured and stored therein prior to said upshifting, into a threshold value memory (24) at a working point location (A) associated with the gear (g) out of which shifting has been performed, (f) defining, for the gear (g) out of which shifting has been performed, as an engine operating zone (II) that is unfavorable in terms of fuel consumption, all working point pairs in which the engine speed is greater than said copied engine speed value and the deflection angle value is less than said copied deflection angle value; and g) signaling on an upshift indicator (25) the desirability of an upshift each time after said instantaneous values define a working point (A) falling within said unfavorable fuel consumption zone (II).

2. Method according to claim 1, wherein said step of deriving a standardized power value comprises forming said value from the difference between the driving speed values measured in brief succession and squared ($n_{1a}^2 - n_{1b}^2$).

3. Method according to claim 2, wherein for each gear (g), in a memory matrix (24a) associated with this gear in the threshold value memory (24) the ascertained threshold values (A1, A2) are recorded in specific memory locations laid out in steps in accordance with engine speed (n) and gas pedal position ($\phi$).

4. Method according to claim 3, wherein before the beginning of the first drive, various basic values are fed in the form of a coarsely defined characteristic curve by erasing memory locations in zone (I) and by setting memory locations in zone (II).

5. Method according to claim 1, wherein during a driving distance, by means of repeated upshifting of the transmission (12) in the various gears (b) at different engine speeds (n) and different gas pedal positions ($\phi$), a plurality of threshold values (A1, A2) are recorded in the threshold value memory (24) laid out for the individual gears (g), these threshold values separating in the operating zone I of the engine (11) that is favorable in terms of fuel consumption from the operating zone II of the engine (11) that is unfavorable in terms of fuel consumption.

6. Method according to claim 1, wherein before the beginning of the first drive, all the memory matrices are erased or set and consequently are occupied by a "0" or "1", respectively.

7. Method according to claim 1, wherein individual threshold values (A1, A2) recorded in the threshold value memory (24) are erased once again, if at these threshold values, during later drives, the standardized power ($Pn_2$) following upshifting of the transmission (12) repeatedly no longer attains the standardized power ($Pn_1$) determined prior to the upshifting.

8. Method according to claim 1, wherein the instantaneous values for the engine speed (n) and the gas pedal position ($\phi$) are each compared with the threshold values (A1, A2) stored in the threshold value memory (24), for the particular gear (g) engaged at that time and that an upshifting signal is triggered whenever the instantaneous values (n, $\phi$) exceed the threshold values in the direction toward the operating zone (II) that is unfavorable in terms of fuel consumption.

9. Intelligent optimum-gear indication circuit for a motor vehicle, comprising a position transducer (18) measuring the gas pedal deflection angle ($\phi$), a speed transducer (21) measuring the engine speed (n), a further speed transducer (22) measuring the driving speed ($n_1$), an upshift indicator (25), and an evaluation circuit device (20) connected to an input of said upshift indicator and to outputs of each of said transducers (18, 21, 22) and having a short-term memory (23) storing a limited number of recent instantaneous transducer output values, said engine speed and deflection angle values together defining a working point pair (A), and an alterable threshold value memory (24), containing, for each gear step of the transmission (12), data classifying each working point pair (A) alternatively into a favorable fuel consumption zone (I) or an unfavorable fuel consumption zone (II), said evaluation circuit device (20) detecting when each gear shift occurs, comparing power before and after each upshift, updating said alterable threshold value memory (24) each time an upshift is accomplished without loss of power, based upon values stored in said short-term memory (23), thereby learning where the boundary between said fuel consumption zones lies for each particular combination of driver, road conditions, and engine conditions, and actuating said upshift indicator (25) whenever said instantaneous value define a working point (A) falling within said unfavorable fuel consumption zone (II).

10. Circuit according to claim 9, characterized in that the threshold value memory (24) comprises one memory matrix (24a) associated with each gear (g), and the memory locations thereof which are located in the operating zone (II) that is unfavorable in terms of fuel consumption have a different content from the memory locations assigned to the zone (I) that is favorable in terms of fuel consumption.

* * * * *